US012084191B2

(12) United States Patent
Le Borloch et al.

(10) Patent No.: US 12,084,191 B2
(45) Date of Patent: Sep. 10, 2024

(54) DEVICE FOR CONTROLLING A MECHANICAL ENERGY REDUCTION ASSEMBLY OF AN AIRCRAFT AND ASSOCIATED METHOD

(71) Applicant: DASSAULT AVIATION, Paris (FR)

(72) Inventors: Jérôme Le Borloch, Saint-Cloud (FR); François Pineau, Saint-Cloud (FR)

(73) Assignee: DASSAULT AVIATION, Paris (FR)

( * ) Notice: Subject to any disclaimer, the term of this patent is extended or adjusted under 35 U.S.C. 154(b) by 210 days.

(21) Appl. No.: 17/724,662

(22) Filed: Apr. 20, 2022

(65) Prior Publication Data
US 2022/0340294 A1    Oct. 27, 2022

(30) Foreign Application Priority Data

Apr. 21, 2021   (FR) .................................... 21 04147

(51) Int. Cl.
| B64D 31/04 | (2006.01) |
| B64C 13/04 | (2006.01) |
| G05G 1/04 | (2006.01) |
| H01H 23/14 | (2006.01) |

(52) U.S. Cl.
CPC .............. B64D 31/04 (2013.01); B64C 13/04 (2013.01); B64C 13/042 (2018.01); G05G 1/04 (2013.01); *G05G 2505/00* (2013.01); *H01H 23/145* (2013.01)

(58) Field of Classification Search
CPC ... B64D 31/04; B64C 13/042; B64C 13/0425; G05G 1/04; H01H 23/145
See application file for complete search history.

(56) References Cited

U.S. PATENT DOCUMENTS

| 3,358,949 A | 12/1967 | Harrisson |
| 10,836,501 B2 | 11/2020 | Granier et al. |
| 2010/0078525 A1* | 4/2010 | Kummle ............. B64C 13/0425 |
| | | 244/236 |
| 2016/0144948 A1* | 5/2016 | Sparks ................... B64D 31/04 |
| | | 74/519 |

(Continued)

FOREIGN PATENT DOCUMENTS

| DE | 3626898 A1 | 2/1988 |
| DE | 102004052757 A1 | 5/2006 |
| FR | 3058805 A1 | 5/2018 |

OTHER PUBLICATIONS

Search Report for priority application FR 21 04147.

*Primary Examiner* — Timothy D Collins
*Assistant Examiner* — Justin Michael Heston
(74) *Attorney, Agent, or Firm* — Davidson Kappel LLC

(57) ABSTRACT

A command device for controlling a mechanical energy reduction assembly of an aircraft, movable between an inactive configuration and a maximum mechanical energy reduction configuration, includes a rocker button, movable between a mechanical energy reduction assembly configuration maintaining position, a first position of incremental movement of the mechanical energy reduction assembly to its maximum mechanical energy reduction configuration and a second position of incremental movement of the mechanical energy reduction assembly to its inactive configuration. The command device further includes at least one return element configured to return the rocker button to its maintaining position.

19 Claims, 4 Drawing Sheets

(56) References Cited

U.S. PATENT DOCUMENTS

| | | | |
|---|---|---|---|
| 2017/0017257 A1 | 1/2017 | Sparks | |
| 2018/0134403 A1* | 5/2018 | Granier | B64D 31/14 |
| 2018/0134404 A1* | 5/2018 | Granier | B64C 13/503 |
| 2019/0152623 A1* | 5/2019 | Porter | B64C 13/0425 |
| 2019/0189373 A1 | 6/2019 | Abdelli et al. | |
| 2022/0340261 A1* | 10/2022 | Le Borloch | G05G 1/015 |

* cited by examiner

DEVICE FOR CONTROLLING A MECHANICAL ENERGY REDUCTION ASSEMBLY OF AN AIRCRAFT AND ASSOCIATED METHOD

The present disclosure relates to a command device for controlling a mechanical energy reduction assembly of an aircraft.

The mechanical energy reduction assembly comprises at least one mechanical energy reduction member, for example, at least one airbrake deployable from a surface of the aircraft to increase the drag of the aircraft.

Such a command device allows a pilot and/or co-pilot of the aircraft to reduce the mechanical energy of an aircraft, for example, during an approach phase to a landing runway or during landing. The mechanical energy reduction assembly reduces the mechanical energy of the aircraft, or, in other words, slows the aircraft down, by increasing its drag.

BACKGROUND

It is known from the state of the art that such a command device is found in the form of a dedicated lever, movable between several predefined positions, each representing a particular arrangement of the mechanical energy reduction assembly and thus of a specific mechanical energy reduction.

Generally, such a lever is placed on the central pylon within the cockpit, so that it can be handled by a pilot and/or a co-pilot and so that it is within their field of vision. Indeed, in addition to its function of controlling the mechanical energy reduction assembly, the lever position provides the pilot and co-pilot with an indication of the current status of the mechanical energy reduction control generated via the lever.

However, during high workload flight phases, the pilot and co-pilot must have precise and simultaneous control over various aircraft parameters, said parameters including the mechanical energy reduction assembly braking. It is thus necessary for the pilot and co-pilot to manipulate a multitude of instruments simultaneously, including the lever dedicated to controlling said mechanical energy reduction assembly. Since these instruments can be dispersed within the cockpit, this complicates the procedures.

Furthermore, it is also known from the state of the art that the mechanical energy reduction assembly can be controlled automatically by automatic aircraft functions, when desired by the pilot and the co-pilot. These automatic functions act superposed on the crew's manual actions on the lever and independently of the lever, to control the mechanical energy reduction assembly automatically, for example.

However, when the mechanical energy reduction assembly configuration is modified by automatic functions, this causes an inconsistency between the configuration adopted by the mechanical energy reduction assembly and the lever position. As such, this may cause pilot and co-pilot error concerning the actual current configuration of the mechanical energy reduction assembly.

SUMMARY

One purpose of the present disclosure is to overcome these drawbacks by providing a command device that enables precise and safe controlling of the aircraft during the approach or landing phases.

To this end, the present disclosure provides a command device for controlling a mechanical energy reduction assembly of an aircraft, the mechanical energy reduction assembly being movable between an inactive configuration and a maximum mechanical energy reduction configuration, the command device comprising a rocker button, movable between a maintaining position for maintaining the configuration of the mechanical energy reduction assembly, a first incremental movement position of incremental movement of the mechanical energy reduction assembly towards its maximum mechanical energy reduction configuration, and a second incremental movement position of incremental movement of the mechanical energy reduction assembly towards its inactive configuration, the command device further comprising at least one return element configured to return the rocker button towards its maintaining position.

The command device according to the present disclosure may comprise one or more of the following features, taken alone or in any technically feasible combination:
- while the rocker button is held in the first incremental movement position, the command device is adapted to continue moving the mechanical energy reduction assembly from the inactive configuration towards the maximum mechanical energy reduction configuration, with the release of the rocker button causing its return to the maintaining position and the immobilization of the mechanical energy reduction assembly in its current configuration, and wherein, while the rocker button is held in the second incremental movement position, the command device is adapted to continue moving the mechanical energy reduction assembly from the maximum mechanical energy reduction configuration towards the inactive configuration, with the release of the rocker button causing its return to the maintaining position and the immobilization of the mechanical energy reduction assembly in its current configuration;
- the rocker button is movable between the first incremental movement position and a first full movement position of full movement of the mechanical energy reduction assembly to its maximum mechanical energy reduction configuration, and between the second incremental movement position and a second full movement position of full movement of the mechanical energy reduction assembly to its inactive configuration, the first incremental movement position being between the maintaining position and the first full movement position and the second incremental movement position being between the maintaining position and the second full movement position;
- the command device further comprises one effort step, between the first incremental movement position and the first full movement position and one effort step, between the second incremental movement position and the second full movement position;
- the second incremental movement position, respectively the second full movement position, is symmetrical to the first incremental movement position, respectively to the first full movement position, in relation to the maintaining position;
- the command device comprises a neutral switch configured to be opened when the rocker button occupies the maintaining position and configured to be closed when the rocker button occupies a position other than the maintaining position;
- the command device comprises a first incremental movement switch, a first full movement switch, a second incremental movement switch, and a second full movement switch, configured such that:

the first incremental movement switch is configured to be closed in the first incremental movement position and in the first full movement position and open otherwise;

the first full movement switch is configured to be closed in the first full movement position and open otherwise; and the second incremental movement switch is configured to be closed in the second incremental movement position and in the second full movement position and open otherwise; and the second full movement switch is configured to be closed in the second full movement position and open otherwise.

The present disclosure also provides a piloting system comprising a command device, as previously described, and a control device for controlling at least one aircraft propulsion engine, the rocker button of the command device being arranged on the control device.

The piloting system according to the present disclosure may comprise one or more of the following features, taken alone or in any technically feasible combination:

the control device comprises a lever, the lever comprising a gripping element having a gripping surface, intended to be in contact with a palm of a hand of the pilot, and two opposite side surfaces, extending on either side of the gripping surface and orthogonally to the gripping surface, the rocker button being arranged on one side surface, so as to be accessible by a thumb of the pilot;

the control device is intended to be arranged in a cockpit of the aircraft;

the command device is intended to be arranged in the cockpit of the aircraft;

the command device is mounted on the control device.

the command device comprises an auxiliary rocker button identical to the rocker button and an auxiliary return element identical to the return element, the auxiliary rocker button being arranged on the side surface opposite to the side surface on which the rocker button is arranged, so as to be accessible by a thumb of a co-pilot;

the command device comprises a protective cap projecting laterally from the side surface and extending at least in part around the rocker button, and a cap projecting laterally from the opposite side surface and extending at least partially around the auxiliary rocker button; and the piloting system further comprises a display device, configured to display data relating to the current configuration of the mechanical energy reduction assembly and/or data relating to the current command of the mechanical energy reduction assembly to a pilot.

The present disclosure also provides an aircraft comprising a command device, as previously described, and an aircraft mechanical energy reduction assembly, movable between an inactive configuration and a maximum mechanical energy reduction configuration, the mechanical energy reduction assembly configuration being:

maintained as is, in the maintaining position of the rocker button, incrementally modified towards to the maximum mechanical energy reduction configuration, while the rocker button is held in the first incremental movement position, and incrementally modified towards the inactive configuration, while the rocker button is held in the second incremental movement position.

The present disclosure further provides a method for controlling a mechanical reduction assembly of an aircraft using a command device as previously described, the method comprising:

placing the rocker button in the maintaining position, to maintain the configuration of the mechanical reduction assembly as is, holding the rocker button in the first incremental movement position, to incrementally modify the configuration of the mechanical energy reduction assembly towards the maximum mechanical energy reduction configuration, and releasing the rocker button to immobilize the mechanical energy reduction assembly in its current configuration; and then, optionally, holding the rocker button in the second incremental movement position, to progressively modify the configuration of the mechanical energy reduction assembly towards the inactive configuration, and releasing the rocker button to immobilize the mechanical energy reduction assembly in its current configuration.

The method according to the present disclosure may comprise one or more of the following features, taken alone or in any technically feasible combination:

the rocker button is movable between the first incremental movement position and a first full movement position of full movement of the mechanical energy reduction assembly to its maximum mechanical energy reduction configuration, and between the second incremental movement position and a second full movement position of full movement of the mechanical energy reduction assembly to its inactive configuration, the method comprising:

placing the rocker button in the first full movement position, to modify the configuration of the mechanical energy reduction assembly to the maximum mechanical energy reduction configuration; and then, optionally, placing the rocker button in the second full movement position, to modify the configuration of the mechanical energy reduction assembly to the inactive configuration; and an intermediate configuration, between the inactive configuration and the maximum mechanical energy reduction configuration is achievable when the rocker button is placed in the first incremental movement position or the second incremental movement position.

BRIEF SUMMARY OF THE DRAWINGS

The present disclosure will be better understood from the following description given only by way of example, and made with reference to the attached drawings, in which.

DETAILED DESCRIPTION

Figure 1:
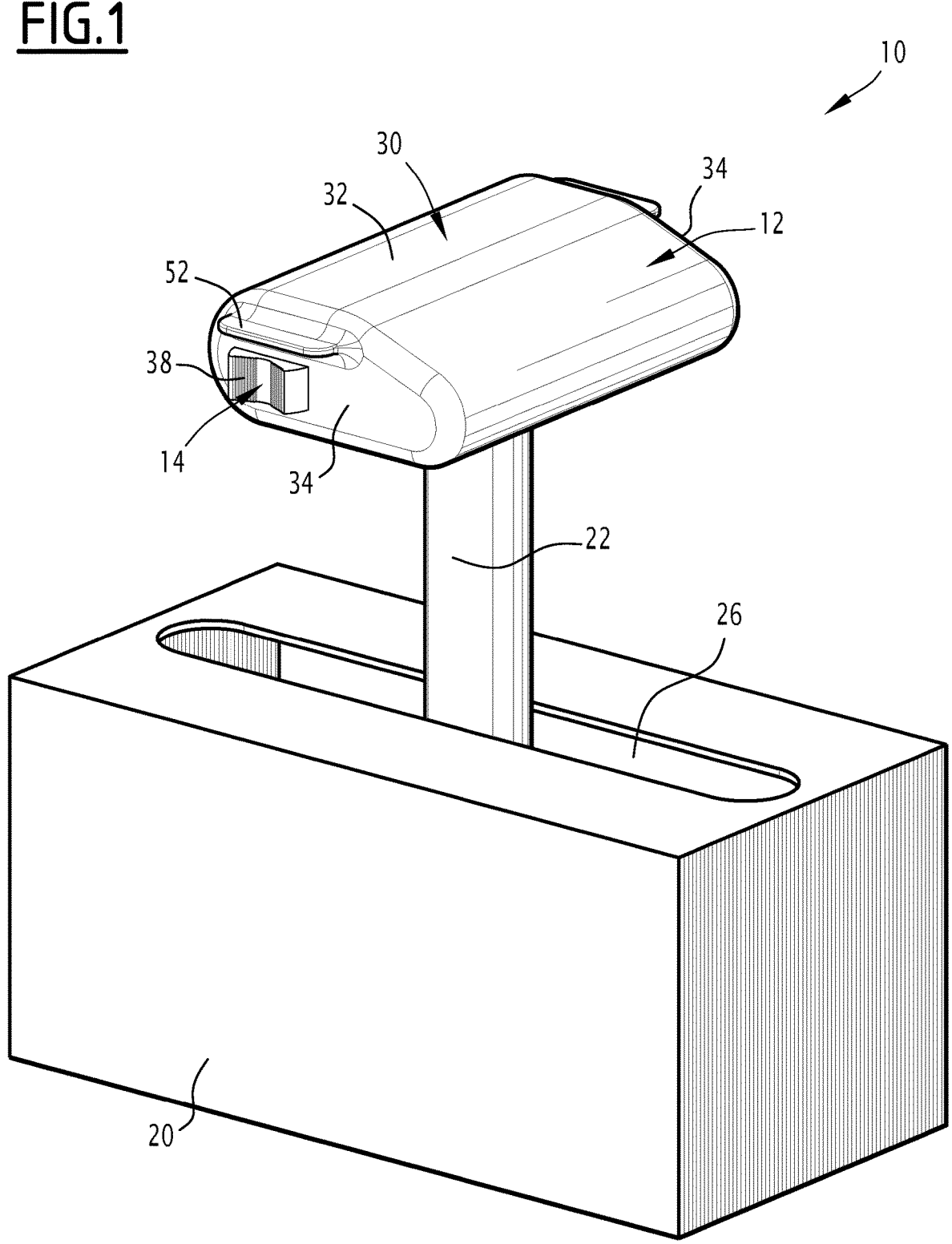
FIG. 1 is a perspective view of a piloting system according to the present disclosure.

A control device 12 for controlling a mechanical reduction assembly of an aircraft will be described with regard to FIGS. 1 through 4.

The aircraft comprises at least one propulsion engine, the aircraft mechanical energy reduction assembly, and a piloting system 10 for piloting the propulsion engine and the mechanical energy reduction assembly.

The or each propulsion engine is suitable to be driven by the piloting system 10 to make an aircraft thrust force evolve.

The mechanical energy reduction assembly is an assembly configured to reduce the mechanical energy of the aircraft, by modifying the aircraft drag, for example. The mechanical energy reduction assembly is suitable to be piloted by the piloting system 10, and is movable between an inactive configuration and a maximum mechanical energy reduction configuration.

For example, the mechanical energy reduction assembly comprises at least one mechanical energy reduction member, for example, at least one airbrake movable between a retracted position, in which it is contained within the aircraft's gauge, and an extended position in which the airbrake extends substantially outside the aircraft's gauge.

Advantageously, the mechanical energy reduction assembly comprises a plurality of mechanical energy reduction members. The mechanical energy reduction members are an airbrake and/or a flaperon, for example. The mechanical energy reduction members are located on a wing, tail and/or fuselage of the aircraft, for example.

In its retracted position, the or each mechanical energy reduction member does not affect the mechanical energy of the aircraft. In the extended position, the or each member reduces the mechanical energy of the aircraft by opposing the airflow around the aircraft. In particular, the or each mechanical energy reduction member is movable between the retracted position and an extreme extended position. Thus, the or each mechanical energy reduction member has a dimension, such as a height, extending continuously out of the gauge by between zero (corresponding to the retracted position) and a maximum dimension (corresponding to the extreme extended position).

Advantageously, the or each mechanical energy reduction member is in the retracted position in the inactive configuration and the or each mechanical energy reduction member is in the extreme extended position in the maximum mechanical energy reduction configuration.

In this example, the or each mechanical energy reduction member is configured to reach a plurality of intermediate positions continuously, between the retracted position and the extreme extended position. Thus, when the reduction member is mounted pivotally about an axis, between the retracted position and the extreme extended position, it is possible to pilot two successive positions of the or each mechanical energy reduction member with an angle increment of less than 1°.

Thus, the mechanical energy reduction assembly is configured to achieve a multitude of intermediate configurations continuously, between the inactive configuration and the maximum mechanical energy reduction configuration. In each intermediate configuration, the or each mechanical energy reduction member occupies a corresponding intermediate position.

In the following, for the sake of brevity, only one mechanical energy reduction member will be described. It should be understood, however, that the description also applies to each mechanical energy reduction member of the mechanical energy reduction assembly, when the mechanical energy reduction assembly comprises multiple members.

The piloting system 10 comprises a control device 12 for the or each propulsion engine, a command device 14 for controlling the mechanical energy reduction assembly, sensors of the status of the mechanical energy reduction assembly, and a display device 16.

The control device 12 is configured to pilot the or each propulsion engine. For example, the control device 12 is intended to be arranged in an aircraft cockpit. With reference to FIG. 1, the control device 12 comprises a support 20, intended to be secured in the aircraft cockpit and a lever 22, mounted movably on the support 20.

The support 20 is suitable for placement in the center pylon, preferably between cockpit seats.

The support 20 has a longitudinal slide 26 to guide the movement of the lever 22.

The lever 22 extends into the slide 26 and is movable longitudinally, to control the or each propulsion engine. In a variant, the lever 22 is movable within the slide 26 in rotation about an axis of rotation perpendicular to the slide 26.

The lever 22 comprises a gripping element 30 having a curved upper gripping surface 32, intended to be in contact with a palm of a pilot's or co-pilot's hand, and two opposite side surfaces 34, extending on either side of the gripping surface 32 and substantially orthogonal to the gripping surface 32.

The gripping element 30 is intended to be handled by the pilot or co-pilot, if applicable, to move the lever 22 longitudinally in the slide 26. The longitudinal position of the lever 22 determines a command order for controlling the thrust of the engines and/or the desired mechanical energy variation of the aircraft, as described in FR 3 058 805. In the latter case, the movement of the lever 22 in the slide 26 is also capable of controlling the mechanical energy reduction assembly.

Advantageously, the command device 14 is intended to be arranged in the aircraft cockpit. For example, the command device 14 is mounted on the control device 12.

The command device 14 comprises a rocker button 38, advantageously movable with respect to a housing 41 between at least three positions, more advantageously at least five positions, as will be described in this example, and a return element 40 for returning the rocker button 38 in position.

Optionally, the command device 14 further comprises two effort steps for the rocker button 38.

Advantageously, the command device 14 comprises a control unit (not shown) for controlling the mechanical energy reduction assembly, a neutral switch, and two movement switches 44, 48. When the rocker button 38 is movable between at least five positions, the command device 14 comprises two additional movement switches 46, 50.

Advantageously, the command device 14 further comprises a cap 52 for protecting the rocker button 38, intended to prevent unintended actions on the rocker button 38.

In this example, the rocker button 38 is positioned on one of the side surfaces 34, to be easily operated by the thumb of a pilot, placing his right hand on the gripping surface 32.

Preferably, the command device 14 comprises an auxiliary rocker button and an auxiliary return element identical to the respective rocker button 38 and return element 40. The auxiliary rocker button is positioned on the other of the side surfaces 34 so that it can be easily operated by the thumb of a pilot, placing his left hand on the gripping surface 32. The command device 14 then comprises two auxiliary effort steps for the auxiliary rocker button, one auxiliary neutral switch, four auxiliary movement switches and one auxiliary cap identical to the respective effort steps, neutral switch, movement switches and cap. The relationships between the auxiliary elements listed above are identical to those between the elements described in detail below.

The rocker button 38 is movable between a maintaining position (visible in bold lines in FIG. 2 and thin lines in FIG. 3) for maintaining the mechanical energy reduction assembly configuration, a first incremental movement position (visible in thin lines in FIG. 2 and FIG. 3) of incremental movement of the mechanical energy reduction assembly toward its maximum mechanical energy reduction configuration, and a second incremental movement position (not shown) of incremental movement of the mechanical energy reduction assembly toward its inactive configuration.

Optionally, the rocker button 38 is movable between the first incremental movement position and a first full movement position (visible in thin lines in FIG. 2 and bold lines in FIG. 3) of full movement of the mechanical energy reduction assembly to its maximum mechanical energy reduction configuration, and between the second incremental movement position and a second full movement position (non-illustrated) of full movement of the mechanical energy reduction assembly to its inactive configuration.

The first incremental movement position is located between the maintaining position and the first full movement position. The second incremental movement position is located between the maintaining position and the second full movement position.

The second incremental movement position is symmetrical to the first incremental movement position in relation to the maintaining position. The second full movement position is symmetrical to the second full movement position in relation to the maintaining position.

Figure 2:
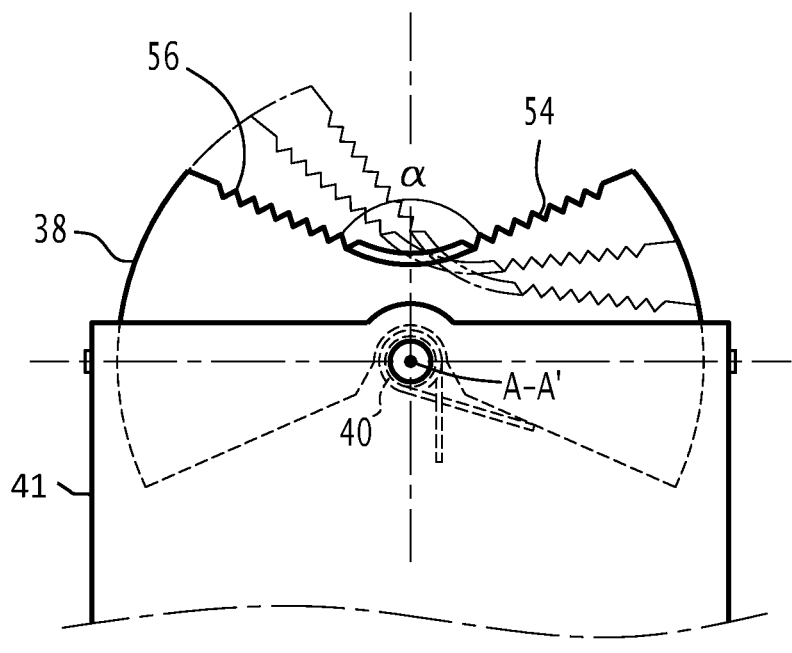
FIG. 2 is a side view of the command device for controlling the piloting system of FIG. 1, with the rocker button in the maintaining position.
Figure 2:
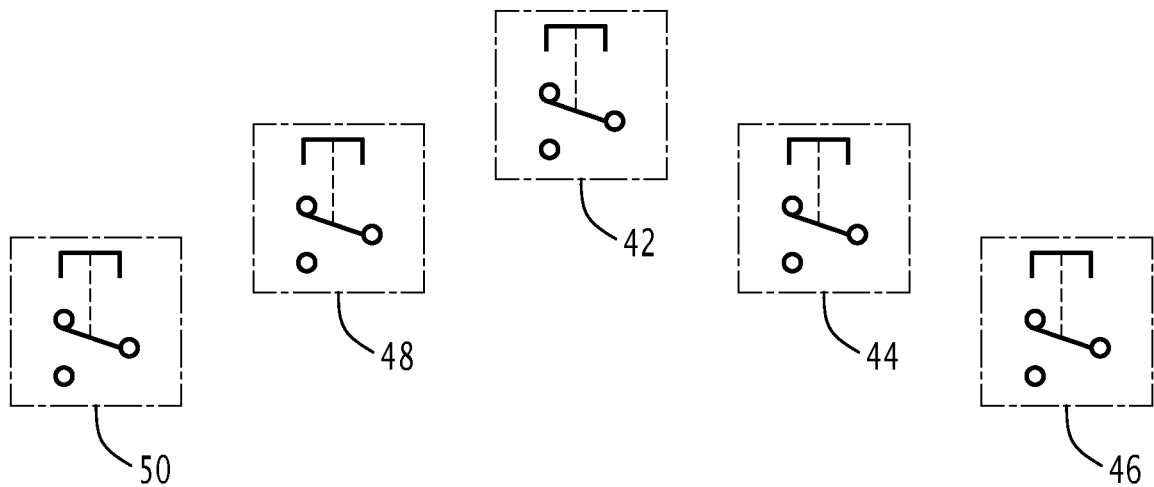
Figure 3:
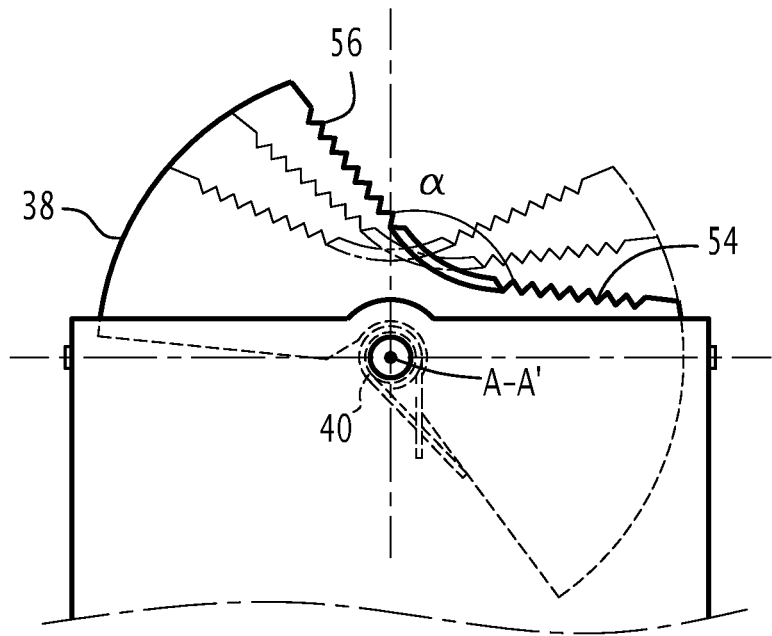
FIG. 3 is a side view of the command device of FIG. 2, with the rocker button in the first full movement position.
Figure 3:
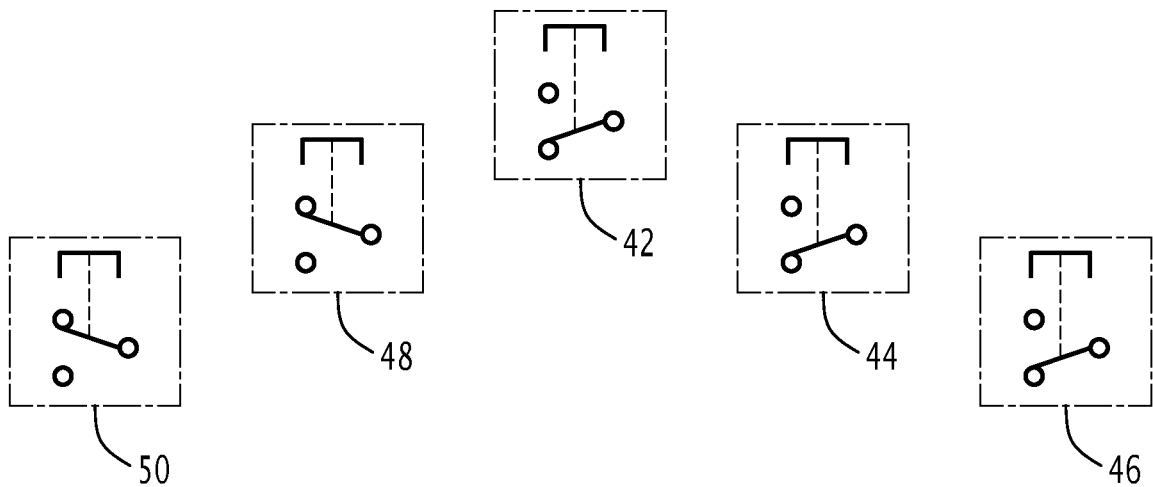

With reference to FIGS. 2 and 3, the rocker button 38 is rotatable about an axis of rotation A-A', parallel here to the axis of the lever 22, between the maintaining position, the first incremental movement position, the second incremental movement position and, if applicable, the first full movement position and the second full movement position.

For example, the rocker button 38 comprises a first bearing surface 54 and a second bearing surface 56.

The first and second bearing surfaces 54, 56 respectively extend in two planes forming an angle α with each other, each plane being substantially parallel to the axis of rotation A-A'.

The first bearing surface 54 is intended to be pressed to move the rocker button 38 to the first incremental movement position and/or the first full movement position.

The second bearing surface 56 is intended to be pressed to move the rocker button 38 to the second incremental movement position and/or the second full movement position.

As illustrated in the example shown in FIG. 1, the rocker button 38 of the command device 14 is arranged on the control device 12. For example, the rocker button 38 is arranged on a side surface 34 of the gripping element 30 of the throttle lever 22, so as to be accessible by a pilot's thumb.

For example, the auxiliary rocker button is arranged on the side surface 34 opposite the side surface 34 on which the rocker button 38 is arranged, so as to be accessible by a co-pilot's thumb.

The return element 40 is configured to return the rocker button 38 towards its maintaining position, in particular from the incremental movement positions and optionally also from the full movement positions.

In particular, the return element 40 is configured to exert a return force on the rocker button 38, the return force tending to return the rocker button 38 towards the maintaining position, which constitutes a rest position.

Advantageously, the return element 40 is a torsion spring. In a variant, the command device 14 comprises a plurality of return elements 40, such as compression springs.

When the rocker button 38 is in the first incremental movement position or the first full movement position and no pressure is applied to the first bearing surface 54, the return element 40 returns the rocker button 38 to the maintaining position from the first incremental movement position or the first full movement position.

When the rocker button 38 is in the second incremental movement position or the second full movement position and no pressure is applied to the second bearing surface 56, the return element 40 returns the rocker button 38 to the maintaining position from the second incremental movement position or the second full movement position.

One effort step is arranged between the first incremental movement position and the first full movement position. The other effort step is arranged between the second incremental position and the second full movement position.

The effort steps require applying a pressing force, greater than a force threshold, appreciable to the user, onto the rocker button 38, to move the rocker button 38 between the first incremental movement position and the first full movement position and between the second incremental movement position and the second full movement position. The effort steps may each be a mechanical structure fixed to the surface of one of the rocker button 38 or housing 41 for contacting the other of rocker button 38 or housing 41 to set the force threshold. The effort steps may also be generated by one or more electromechanical devices coupled to rocker button 38 and controlled by the control unit for setting the force threshold.

The control unit is connected electrically to the neutral switch 42 and to each movement switch 44, 46, 48, 50. The control unit is suitable for controlling the mechanical energy reduction assembly as a function of the position of the rocker button 38, in particular as a function of the status of the neutral switch 42 and the movement switches 44, 46, 48, 50.

The neutral switch 42 is configured to be open when the rocker button 38 occupies the maintaining position and configured to be closed when the rocker button 38 occupies a position other than the maintaining position.

While the neutral switch 42 is open, the control unit holds the configuration of the mechanical energy reduction assembly as is. In the event of the command device 14 malfunctioning, the neutral switch 42 remains in the open position, thereby preventing any erroneous command to mechanical energy reduction assembly. Thus, the mechanical energy reduction assembly configuration is kept as is in the maintaining position of the rocker button 38.

The movement switches 44, 46, 48, 50 are a first incremental movement switch 44 associated with the first incremental movement position, a first full movement switch 46 associated with the first full movement position, a second incremental movement switch 48 associated with the second incremental movement position and a second full movement switch 50 associated with the second full movement position.

The first incremental movement switch 44 is configured to be closed in the first incremental movement position and in the first full movement position and open otherwise.

The first full movement switch 46 is configured to be closed in the first full movement position and open otherwise.

The second incremental movement switch 48 is configured to be closed in the second incremental movement position and in the second full movement position and open otherwise.

The second full movement switch 50 is configured to be closed in the second full movement position and open otherwise.

In the following, the logic with which the control unit drives the mechanical energy reduction assembly will be described. It is assumed that no malfunctions impact the command device 14 and therefore when the neutral switch 42 is open, the rocker button 38 occupies the maintaining position and when the neutral switch 42 is closed, the rocker button 38 occupies a position other than the maintaining position.

When the neutral switch 42 is closed, when the first incremental movement switch 44 is closed, and, if applicable, when the first full movement switch 46 is open, the control unit drives the mechanical energy reduction assembly incrementally, to increase the mechanical energy reduction toward the maximum mechanical energy reduction configuration.

"Incrementally" means that the mechanical energy reduction member is moved progressively, by one unit movement per each unit time, to the extreme extended position, while the first incremental movement switch 44 is closed. Such a unit movement per each unit time is less than 30% of the movement of the mechanical reduction member between the retracted position and the extreme extended position, for example.

The mechanical energy reduction member is not constrained to a limited number of separate discrete positions between the retracted position and the extreme extended position (such as less than 10), but is capable of occupying any intermediate position resulting from the incremental movement made, corresponding to the time during which the rocker button 38 occupies the first incremental movement position.

For example, from the inactive configuration, the mechanical energy reduction assembly is moved to the maximum reduction configuration when the neutral switch 42 is closed and when the first incremental movement switch 44 is held closed for a time interval of between 3 seconds and 6 seconds, advantageously equal to 4 seconds.

From the inactive configuration, when the neutral switch 42 is closed and when the first incremental movement switch 44 is held closed for less than the time interval, the mechanical energy reduction assembly is placed in an intermediate configuration between the inactive configuration and the maximum reduction configuration.

Thus, the configuration of the mechanical energy reduction assembly is incrementally modified, towards the maximum mechanical energy reduction configuration, while the rocker button 38 is held in the first incremental movement position.

In contrast, as soon as the rocker button 38 leaves its first incremental movement position to return to the maintaining position, as a result of the return force exerted by the return element 40, for example, the position command of the or each mechanical energy reduction member remains frozen, and the mechanical energy reduction assembly comes to rest in its current configuration.

When the neutral switch 42, the first incremental movement switch 44 and the first full movement switch 46 are closed, the control unit drives the mechanical energy reduction assembly fully until the maximum mechanical energy reduction configuration.

"Fully" means that the mechanical energy reduction assembly is moved until the maximum reduction configuration regardless of how long the first full movement switch 46 is closed.

Thus, the configuration of the mechanical energy reduction assembly is fully modified, until the maximum mechanical energy reduction configuration, as soon as the rocker button 38 is in the first full movement position.

When the neutral switch 42 is closed, when the second incremental movement switch 48 is closed and, if applicable, when the second full movement switch 50 is open, the control unit drives the mechanical energy reduction assembly in decreasing increments of mechanical energy reduction towards the inactive configuration.

"In increments" means that the mechanical energy reduction member is moved progressively towards the retracted position, by one unit movement per each unit of time, while the second incremental movement switch 48 is closed.

As before, the mechanical energy reduction member is not constrained to a limited number of discrete separated positions between the extreme extended position and the retracted position (such as less than 10), but is capable of occupying any intermediate position resulting from the incremental movement made, corresponding to the time in which the rocker button 38 occupies the second incremental movement position.

For example, from the maximum mechanical energy reduction configuration, the mechanical energy reduction assembly is moved to the inactive configuration when the neutral switch 42 is closed and when the second incremental movement switch 48 is held closed for a time interval between 3 seconds and 6 seconds, advantageously equal to 4 seconds.

From the maximum reduction configuration, when the neutral switch 42 is closed and when the second incremental movement switch 48 is held closed for less than the time interval, the mechanical energy reduction assembly is placed in an intermediate configuration between the inactive configuration and the maximum reduction configuration.

Thus, the configuration of the mechanical energy reduction assembly is incrementally modified, towards the inactive configuration, while the rocker button 38 is held in the second incremental movement position.

As soon as the rocker button 38 leaves its second incremental movement position to return to the maintaining position, for example as a result of the return force exerted by the return element 40, the position control of the or each mechanical energy reduction member remains frozen, and the mechanical energy reduction assembly comes to rest in its current configuration.

When the neutral switch 42, the second incremental movement switch 48 and the second full movement switch 50 are closed, the control unit drives the mechanical energy reduction assembly to the fully inactive configuration.

"Fully" means that the mechanical energy reduction assembly is moved until the inactive configuration regardless of how long the second full movement switch 50 is closed.

Thus, the configuration of the mechanical energy reduction assembly is modified fully, to the inactive configuration, as soon as the rocker button 38 is in the second full movement position.

When the rocker button 38 is between the maintaining position and an incremental movement position or between an incremental movement position and a full movement position, the control unit does not perform any control over the mechanical energy reduction assembly.

Advantageously, the control unit is further configured to generate data relating to a current command of the mechanical energy reduction assembly. The current command corresponds to the current control of the mechanical energy reduction assembly.

With reference to FIG. 1, the protective cap 52 projects laterally from the side surface 34 of the gripping element 30 of the throttle lever 22 on which the rocker button 38 is arranged and extends at least partially around the rocker button 38.

Thus, the rocker button 38 is at least partially covered vertically by the protective cap 52. This reduces the risk of inadvertent movement of the rocker button 38.

The auxiliary protective cap projects laterally from the opposite side surface 34 and extends at least partially around the auxiliary rocker button.

The mechanical energy reduction assembly status sensors are configured to determine the current configuration of the mechanical energy reduction assembly and to generate data relating to said current configuration. For example, to do so, said sensors are configured to determine the position of the mechanical energy reduction member.

The display device 16 is connected to the sensors and/or the control unit. The display device 16 is configured to receive data relating to the current configuration of the mechanical energy reduction assembly from the sensors and/or to receive data relating to the current command of the mechanical energy reduction assembly from the central controller.

The display device 16 is configured to display data, to a pilot and/or co-pilot, relating to the current configuration of the mechanical energy reduction assembly and/or the data relating to the current command of the mechanical energy reduction assembly. In this way, those navigating have a visualization of the current configuration of the mechanical energy reduction assembly and/or the current command of the mechanical energy reduction assembly. For example, the display device 16 comprises a head-down display or a head-up display.

The data relating to the current configuration and/or current command of the mechanical energy reduction assembly is displayed on the display device 16 as a gauge 60, for example.

The gauge 60 is empty when the mechanical energy reduction assembly is in an inactive configuration and/or when the control of the mechanical energy reduction assembly corresponds to piloting in an inactive configuration, for example, and full when the mechanical energy reduction assembly is in a maximum mechanical energy reduction configuration and/or when the control of the mechanical energy reduction assembly corresponds to piloting in a maximum mechanical energy reduction configuration. It gradually fills, correspondingly to the configuration and/or command of the mechanical energy reduction assembly between the inactive configuration and the maximum mechanical energy reduction configuration.

Figure 4:
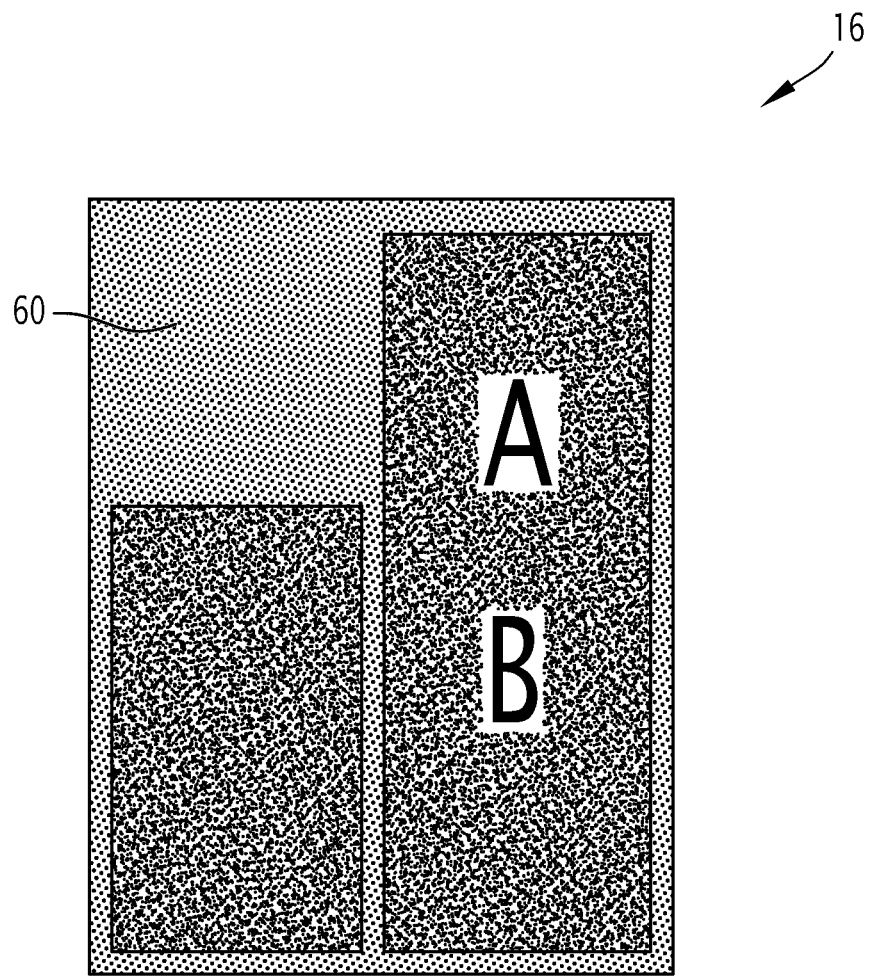
FIG. 4 is a representation of the display device of the piloting system of FIG. 1.

With reference to FIG. 4, the gauge 60 is partially filled, which reflects that the mechanical energy reduction assembly is in an intermediate configuration between the inactive configuration and the maximum mechanical energy reduction configuration, for example.

According to a non-illustrated variant, at least two separate gauges 60 are displayed on the display device 16. At least a first gauge 60 relates to the current configuration of the mechanical energy reduction assembly and at least a second gauge 60 relates to the current command of the mechanical energy reduction assembly.

According to another non-illustrated variant, a single gauge 60 is displayed on the display device 16. It progressively fills to a first fill level corresponding to the current configuration, with a first color, for example, and to a second fill level, corresponding to the current command, with a second color, for example. The single gauge 60 thus has two fill levels that are equal when the current configuration corresponds to the current command.

According to yet another non-illustrated variant, a single gauge 60 is displayed on the display device 16. The single gauge 60 fills progressively, correspondingly to one between the current configuration and the current command of the mechanical energy reduction assembly. Advantageously, the data relating to the other of the current configuration and the current command is displayed on the display device 16 in the form of a dash superimposed on the gauge 60, the position of the dash along the gauge 60 corresponding to the other of the current configuration and the current command.

In yet another non-illustrated variant, only one gauge 60 is displayed on the display device. The data relating to one of the current configuration and the current command is displayed on the display device 16 as a first dash superimposed on the gauge 60. The data for the other of the current configuration and the current command is displayed on the display device 16 as a second dash also superimposed on the gauge 60. The position of the first dash along the gauge 60 corresponds to one of the current configuration and the current command, and the position of the second dash along the gauge 60 corresponds to the other of the current configuration and the current command.

In the following, a method of controlling the mechanical energy reduction assembly using the command device 14 is described.

Initially, the rocker button 38 is placed in the maintaining position, which holds the configuration of the mechanical energy reduction assembly.

To modify the configuration of the mechanical energy reduction assembly incrementally, towards the maximum mechanical energy reduction configuration, the rocker button 38 is placed in the first incremental movement position and is held in that position. To hold the rocker button 38 in the first incremental movement position, the pilot applies a sub-threshold force to the first bearing surface 54. The pilot tracks the progress of the movement of the mechanical energy reduction assembly on the display device 16.

Thus, for example, to place the mechanical energy reduction assembly in an intermediate configuration between the inactive configuration and the maximum mechanical energy reduction configuration, the rocker button 38 is held in the first incremental movement position for a period of time until the mechanical energy reduction assembly reaches the desired configuration. In particular, reaching the desired configuration is recognized when the current configuration data of the mechanical energy reduction assembly displayed by the display device 16 matches the desired configuration. When the desired configuration is reached, the pilot or co-pilot stops applying the pressing force to the first bearing surface 54. The return element 40 then returns the rocker button 38 to the maintaining position.

From the maintaining position, and to modify the configuration of the mechanical energy reduction assembly incrementally towards the inactive configuration, the rocker button 38 is placed in the second incremental movement position and held in that position. To hold the rocker button 38 in the second incremental movement position, the pilot applies a sub-threshold force to the second bearing surface

56. Again, the pilot tracks the progress of the movement of the mechanical energy reduction assembly on the display device 16.

Similarly, to place the mechanical energy reduction assembly in an intermediate configuration between the inactive configuration and the maximum mechanical energy reduction configuration, for example, the rocker button 38 is held in the second incremental movement position for a period of time until the mechanical energy reduction assembly reaches the desired configuration. When the desired configuration is reached, the pilot or co-pilot stops applying the pressing force to the second bearing surface 56. The return element 40 then returns the rocker button 38 to the maintaining position.

To modify the configuration of the mechanical energy reduction assembly fully, to the maximum mechanical energy reduction configuration, the rocker button 38 is placed in the first full movement position, for example. To place the rocker button 38 in the first full movement position, the pilot or co-pilot applies an above-threshold force to the first bearing surface 54 to surpass the effort step.

To modify the configuration of the mechanical energy reduction assembly fully, until the inactive configuration, for example, the rocker button 38 is placed in the second full movement position. To place the rocker button 38 in the second full movement position, the pilot or co-pilot applies an above-threshold force to the second bearing surface 56 to surpass the effort step.

Thus, to place the mechanical energy reduction assembly in the maximum mechanical energy reduction configuration, either the rocker button 38 is placed in the first full movement position or the rocker button 38 is held in the first incremental movement position until the mechanical energy reduction assembly reaches the maximum reduction configuration.

To place the mechanical energy reduction assembly in the inactive configuration, either the rocker button 38 is placed in the second full movement position, or the rocker button 38 is held in the second incremental movement position until the mechanical energy reduction assembly reaches the inactive configuration.

According to an unillustrated variant, the rocker button 38 is movable between only three positions, in particular between the maintaining position, the first incremental movement position and the second incremental movement position.

According to another embodiment wherein the mechanical energy reduction assembly comprises a plurality of mechanical energy reduction members, each mechanical energy reduction member is configured to be in either the retracted position or the extreme extended position. In an intermediate configuration of the mechanical energy reduction assembly, some combination of members are in the retracted position and the remaining members are in the extreme extended position so as to achieve the desired mechanical energy reduction. "Incremental" means, for example, that the mechanical energy reduction members are successively moved towards the respective extreme extended or retracted position while the respective first incremental movement switch 44 or second incremental movement switch 48 is closed. The sequence of successive movement of the mechanical energy reduction members (the identity of the members moved and the order in which they are moved, for example) towards the extreme extended position or towards the retracted position depends on several criteria, among which are the comfort of the passengers, the progressiveness of the mechanical energy variation by the mechanical energy reduction assembly and the linearity of this variation. There are a large number of different sequences of successive movement of the components. For example, a particular sequence of successive movement of the members is implemented by the control unit as a function of its compliance with a particular criterion. Advantageously, the said criterion is selected by the flight crew via a human/machine interface.

Thanks to the present disclosure, the pilot and the co-pilot of the aircraft can easily control the thrust and the drag of the aircraft simultaneously by manipulating the device 12 for controlling the at least one propulsion engine and the device 14 for controlling the mechanical energy reduction assembly with one hand.

Thus, two aircraft control instruments are grouped together in the cockpit so as to facilitate flight procedures.

In addition, as the rocker button 38 is returned to the maintaining position from the first and second incremental movement positions, issues of inconsistency, between the actual current configuration of the mechanical energy reduction assembly and the information about this actual current configuration conveyed by the control device, are eliminated. To know the actual current configuration of the mechanical energy reduction assembly, the pilot and co-pilot refer to the display device 16.

The invention claimed is:

1. A command device for controlling a mechanical energy reduction assembly of an aircraft, the mechanical energy reduction assembly being movable between an inactive configuration and a maximum mechanical energy reduction configuration, the command device comprising:
   a rocker button movable between a maintaining position for maintaining the configuration of the mechanical energy reduction assembly, a first incremental movement position of incremental movement of the mechanical energy reduction assembly towards the maximum mechanical energy reduction configuration and a second incremental movement position of incremental movement of the mechanical energy reduction assembly towards the inactive configuration; and
   at least one return element configured to return the rocker button towards the maintaining position.

2. The command device according to claim 1, wherein, while the rocker button is held in the first incremental movement position, the command device is configured to continue moving the mechanical energy reduction assembly from the inactive configuration towards the maximum mechanical energy reduction configuration, with a release of the rocker button causing the rocker button to return to the maintaining position and causing an immobilization of the mechanical energy reduction assembly in a current configuration, and wherein, while the rocker button is held in the second incremental movement position, the command device is configured to continue moving the mechanical energy reduction assembly from the maximum mechanical energy reduction configuration towards the inactive configuration, with the release of the rocker button causing the rocker button to return to the maintaining position and causing the immobilization of the mechanical energy reduction assembly in the current configuration.

3. The command device according to claim 1, wherein the rocker button is movable between the first incremental movement position and a first full movement position of full movement of the mechanical energy reduction assembly to the maximum mechanical energy reduction configuration, and between the second incremental movement position and a second full movement position of full movement of the mechanical energy reduction assembly to the inactive configuration, the first incremental movement position being between the maintaining position and the first full movement position and the second incremental movement position being between the maintaining position and the second full movement position.

4. The command device according to claim 3, further comprising one effort step between the first incremental movement position and the first full movement position, and one effort step between the second incremental movement position and the second full movement position.

5. The command device according to claim 3, wherein the second incremental movement position is symmetrical to the first incremental movement position in relation to the maintaining position, and the second full movement position is symmetrical to the second full movement position in relation to the maintaining position.

6. The command device according to claim 1, further comprising a neutral switch configured to be opened when the rocker button occupies the maintaining position and configured to be closed when the rocker button occupies a position other than the maintaining position.

7. The command device according to claim 6, wherein the rocker button is movable between the first incremental movement position and a first full movement position of full movement of the mechanical energy reduction assembly to the maximum mechanical energy reduction configuration, and between the second incremental movement position and a second full movement position of full movement of the mechanical energy reduction assembly to the inactive configuration, the first incremental movement position being between the maintaining position and the first full movement position and the second incremental movement position being between the maintaining position and the second full movement position, the command device comprising a first incremental movement switch, a first full movement switch, a second incremental movement switch, and a second full movement switch, configured such that:
  the first incremental movement switch is configured to be closed in the first incremental movement position and in the first full movement position and open otherwise;
  the first full movement switch is configured to be closed in the first full movement position and open otherwise;
  the second incremental movement switch is configured to be closed in the second incremental movement position and in the second full movement position and open otherwise; and
  the second full movement switch is configured to be closed in the second full movement position and open otherwise.

8. A piloting system comprising:
  the command device according to claim 1; and
  a control device for controlling at least one aircraft propulsion engine, the rocker button of the command device being arranged on the control device.

9. The piloting system according to claim 8, wherein the control device comprises a lever, the lever comprising a gripping element having a gripping surface arranged to be in contact with a palm of a hand of a pilot and two opposite side surfaces extending on either side of the gripping surface and orthogonally to the gripping surface, the rocker button being arranged on one side surface so as to be accessible by a thumb of the pilot.

10. The piloting system according to claim 9, wherein the command device comprises an auxiliary rocker button identical to the rocker button and an auxiliary return element identical to the return element, the auxiliary rocker button being arranged on the side surface opposite the side surface on which the rocker button is arranged, so as to be accessible by a thumb of a co-pilot.

11. The piloting system according to claim 10, wherein the command device comprises a protective cap projecting laterally from the side surface and extending at least partially around the rocker button, and a cap projecting laterally from the opposite side surface and extending at least partially around the auxiliary rocker button.

12. The piloting system according to claim 8, further comprising a display device configured to display data relating to a current configuration of the mechanical energy reduction assembly and/or data relating to a current command of the mechanical energy reduction assembly to a pilot.

13. An aircraft comprising:
  the command device according to claim 1; and
  the mechanical energy reduction assembly movable between the inactive configuration and the maximum mechanical energy reduction configuration, the mechanical energy reduction assembly configuration being:
    maintained as is, in the maintaining position of the rocker button,
    incrementally modified, towards the maximum mechanical energy reduction configuration, while the rocker button is held in the first incremental movement position, and
    incrementally modified, towards the inactive configuration while the rocker button is held in the second incremental movement position.

14. A method of controlling the mechanical energy reduction assembly of the aircraft using the command device according to claim 1, the method comprising:
  placing the rocker button in the maintaining position, to maintain the configuration of the mechanical energy reduction assembly as is;
  holding the rocker button in the first incremental movement position, to incrementally modify the configuration of the mechanical energy reduction assembly towards the maximum mechanical energy reduction configuration; and
  releasing the rocker button, to immobilize the mechanical energy reduction assembly in the current configuration.

15. The method according to claim 14, further comprising holding the rocker button in the second incremental movement position, to incrementally modify the configuration of the mechanical energy reduction assembly towards the inactive configuration, and releasing the rocker button to immobilize the mechanical energy reduction assembly in the current configuration.

16. The method according to claim 14, wherein the rocker button is movable between the first incremental movement position and a first full movement position of full movement of the mechanical energy reduction assembly to the maximum mechanical energy reduction configuration, and between the second incremental movement position and a second full movement position of full movement of the mechanical energy reduction assembly to the inactive configuration, the method comprising:
  placing the rocker button in the first full movement position to modify the configuration of the mechanical energy reduction assembly to the maximum mechanical energy reduction configuration.

17. The method according to claim 16, further comprising placing the rocker button in the second full movement position to modify the configuration of the mechanical energy reduction assembly to the inactive configuration.

18. The method according to claim 14, wherein an intermediate configuration between the inactive configuration and the maximum mechanical energy reduction configuration is achievable when the rocker button is placed in the first incremental movement position or the second incremental movement position.

19. A method of controlling the mechanical energy reduction assembly of the aircraft using the command device according to claim 7, the method comprising:
   placing the rocker button in the maintaining position, to maintain the configuration of the mechanical energy reduction assembly as is;
   holding the rocker button in the second incremental movement position, to incrementally modify the configuration of the mechanical energy reduction assembly towards the inactive configuration; and
   releasing the rocker button, to immobilize the mechanical energy reduction assembly in the current configuration.

* * * * *